United States Patent [19]
Schramm

[11] 3,837,665
[45] Sept. 24, 1974

[54] ELEVATABLE TRAILER MECHANISM

[76] Inventor: Arthur G. Schramm, 3113 N. Highland Ave., Phoenix, Ariz. 85016

[22] Filed: Oct. 1, 1973

[21] Appl. No.: 402,173

[52] U.S. Cl............................. 280/43.18, 214/506
[51] Int. Cl............................................ B62d 21/14
[58] Field of Search..... 214/506; 280/43, 46, 43.11, 280/43.17, 43.23

[56] References Cited
UNITED STATES PATENTS

| | | | |
|---|---|---|---|
| 2,650,730 | 9/1953 | Rohm | 280/43.17 |
| 2,905,481 | 9/1959 | Schramm | 280/43.11 |
| 2,990,966 | 7/1961 | Schramm | 214/505 |
| 3,427,041 | 2/1969 | Nichols | 280/43.18 |

*Primary Examiner*—Allen N. Knowles
*Assistant Examiner*—H. Grant Skaggs, Jr.

[57] ABSTRACT

An elevatable trailer having a tongue adapted to be coupled to a towing vehicle. A frame provided with a tongue guide in which said tongue is movable forwardly and backwardly; and linkage and lever means comprising bell crank arms pivoted on the frame of the trailer and carrying wheels such that the linkage means pivots the bell crank arms and thereby elevates the frame when the tongue is pulled forward and latch means for latching the tongue in forward position relative to the frame for maintaining the frame in elevated position relative to the ground and on the wheels carried by the bell crank arms.

The disclosure also relating to novel frame guide and latch means for guiding the tongue relative to the frame and for latching the tongue in forward position.

The disclosure also relating to the novel scissor linkage mechanism interconnecting a pair of bell crank arms by means of suspension springs and tension rods to provide efficient tandem axle lifting of an elevatable trailer frame.

The disclosure also relating to means for locking wheels of the trailer in relation to the bell crank arms so that the wheels are frictionally held on the ground while the tongue of the trailer is pulled forward and the bell crank arms are thereby pivoted relative to the frame for elevating it upwardly from the ground level.

9 Claims, 16 Drawing Figures

ELEVATABLE TRAILER MECHANISM

BACKGROUND OF THE INVENTION

The prior art contains a variety of elevatable trailers many of which have been operable by hydraulic cylinders serving as power units to pivot bell crank arms and thereby elevate a trailer frame with wheels coupled to the bell crank arms. In many of these units the power supply is provided by a stationary engine and hydraulic pump unit on the trailer itself. These hydraulic systems are quite expensive and require substantial maintenance. Additionally, the motors for such hydraulic systems are often times inconvenient to start especially in cold weather and consequently the economy of purchasing, operating and maintaining elevatable trailers using hydraulic lift systems is prohibitive for many uses and applications.

PRIOR ART

The U.S. Pat. No. 2,990,966 issued to Arthur G. Schramm is believed to be the closest prior art.

SUMMARY OF THE INVENTION

The present invention relates to an elevatable trailer utilizing wheel mounting bell crank mechanisms coupled to a trailer frame and having suspension springs coupled to the bell cranks and connected by means of tension rods to a trailer tongue which is movable forwardly and rearwardly relative to the trailer frame and thereby capable of pivoting the bell cranks for raising and lowering the trailer frame. Additionally latch means is provided for latching the tongue in forward position relative to the frame for holding the trailer in elevated position. The invention comprises novel tongue guide means for guiding the tongue relative to the forward portion of the trailer frame during the forward and rearward movements of the tongue relative to the frame and during the respective elevating and lowering of the trailer frame relative to the ground by actuation of the wheel mounting bell cranks of the invention.

The invention comprises novel guide means for guiding the movement of the trailer tongue relative to a forward portion of the trailer frame. The guide means comprising inclined structure on the frame adapted to traverse complimental guide means on the tongue so as to provide for upward and downward movement of the forward portion of the frame so as to tilt the frame over the axis of the wheels which are held by bell cranks pivoted to the trailer frame. The inclined guide means on the front of the frame and cooperating with the tongue operates concurrently with the wheel mounting bell cranks such that the upper end of the trailer frame is guided upwardly relative to the tongue while the bell cranks are pivoted in such a manner as to concurrently lower the rearward end of the trailer and thus providing compound action for raising and lowering the trailer relative to the ground so as to permit easy loading at ground level and easy and rapid elevation of the trailer frame when the tongue of the trailer is pulled forward relative to the frame and relative to the aforementioned inclined guide means. Additionally, latch mechanism adjacent the forward portion of the trailer frame is adapted to latch the tongue in a forward position for holding the forward portion of the frame downwardly relative to the tongue and rearwardly so as to maintain the wheel mounting bell cranks in elevated position and also to maintain the frame of the trailer in elevated position for transport.

The invention also comprises novel scissor linkage for use in pivotally actuating a pair of tandem wheel mounting bell crank systems wherein the bell crank elements of the system each have a suspension spring and the suspension springs are disposed in tandem relation and coupled to the scissor linkage by means of tension rods. The scissor linkage comprising a pair of scissor levers having upper and lower ends and intermediate portions; the intermediate portions of the scissor levers being pivoted together. One of the scissor levers at its lower end being pivoted to the frame and the other scissor lever at its lower end being pivoted to an actuating tension rod coupled by leverage and linkage means to the tongue of the trailer which is movable forwardly and rearwardly relative to a forward portion of the trailer frame. Also an inclined guide means at the front of the frame is adapted to traverse upwardly and forwardly a complimental guide means carried on the tongue so as to concurrently raise the forward portion of the trailer relative to the tongue while the rearward portion thereof is lowered by pivoting the rear mounting bell cranks such as to lower the frame relative to the ground of the rearward portion thereof.

In accordance with the foregoing, the invention comprises an elevatable trailer having a tongue which is movable relative to the trailer frame and adapted to be coupled to a towing vehicle such that when the towing vehicle moves forward and when the wheels of the trailer are locked relative to the ground either by means of special locking means or by means of conventional wheel brakes such as automotive breaks, the forward movement of the vehicle will cause lever and linkage means to actuate wheel mounting bell cranks and to raise the trailer bed relative to the ground. Additionally the aforementioned inclined guide means also tends to concurrently lower the forward part of the frame relative to the tongue and the aforementioned latch means operates to latch the mechanism in position so as to hold the trailer frame in elevated position as the towing vehicle moves away after pulling forward on the tongue and actuating the elevating mechanism. Additionally, a very simple latch mechanism is provided for either setting the latch mechanism to respond to rearward movement of the vehicle for lowering the elevatable trailer or to allow elevation of the trailer and latching it in elevated position as desired.

Accordingly, it is an object of the invention to provide a very simple and economical elevatable trailer which only utilizes the power of the towing vehicle for elevating the trailer from a ground level position to a transport position.

Another object of the invention is to provide an elevatable trailer having novel tongue and frame means wherein the tongue is movable relative to the frame and inclined guide means cooperable with the tongue and the frame allow the frame to move upwardly and forwardly above the tongue level while wheel mounting bell cranks concurrently allow lowering of the rearward portion of the frame, all accomplished by lever and linkage means coupling the suspension springs on the bell cranks with the trailer tongue which is movable relative to the forward portion of the frame.

Another object of the invention is to provide a very simple and easily operable latch means which allows the operator selectively to set the latch mechanism for release to lower the trailer with a rearward movement of the towing vehicle or to accomplish latching of the trailer frame in an elevated transport position with a forward movement of the towing vehicle.

Another object of the invention is to provide an elevatable trailer which is very simple and economical of construction and very durable in proportion to the application for which it is intended.

Another object of the invention is to provide a very simple wheel locking system for locking the wheels of the trailer relative to the wheel supporting bell cranks of the invention so as to afford sufficient resistence to permit the towing vehicle coupled to the tongue of the trailer to actuate the wheel mounting bell cranks for elevating the frame of the trailer.

Another object of the invention is to provide a very novel scissor linkage and leverage mechanism for use in connection with tandem wheel trailers for actuating and coordinating the actuation of wheel mounting bell cranks of tandem wheels to elevate the trailer frame in response to force applied in a forward direction on the tongue of the trailer which is movable relative to the trailer frame.

Further objects and advantages of the invention may be apparent from the following specification, appended claims and accompanying drawings.

DESCRIPTION OF THE PREFERRED EMBODIMENTS

Figures 1, 2, 3:
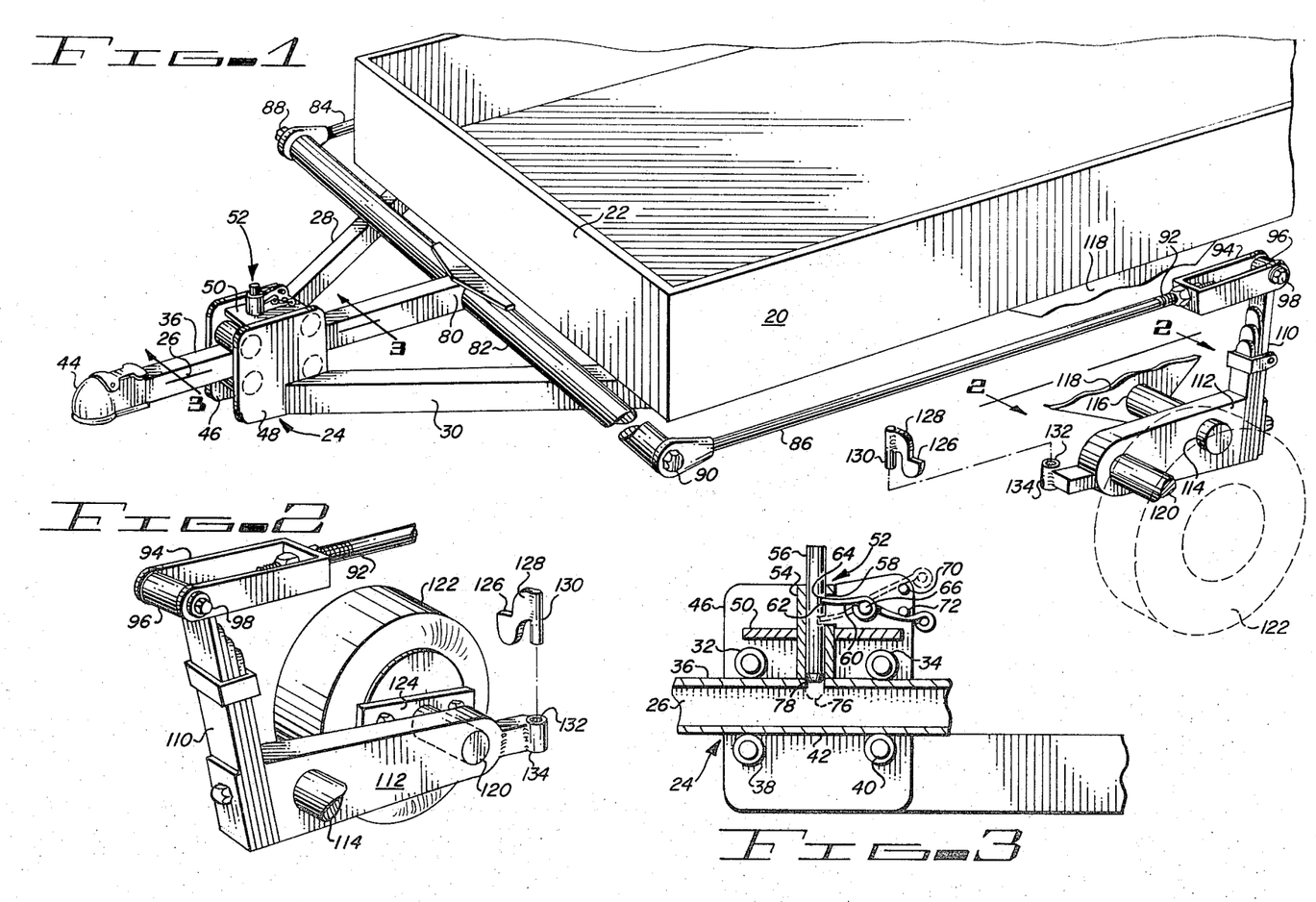
FIG. 1 is a perspective view of an elevatable trailer of the invention showing portions thereof fragmentarily and in sections.
FIG. 2 is a fragmentary sectional view taken from the line 22 of FIG. 1 and showing the structure on a large scale together with a wheel locking device in exploded position relative to the wheel mounting bell crank mechanism.
FIG. 3 is an enlarged vertical fragmentary sectional view taken from the line 33 of FIG. 1 showing the tongue latch mechanism.

As shown in FIG. 1 of the drawings, the elevatable trailer of the invention is provided with a frame 20 having a forward portion 22 provided with a tongue guide mechanism 24 in which a tongue 26 is movably mounted to move forward and backward as will be hereinafter described. The guide mechanism 24 is coupled to converging forward portions 28 and 30 of the frame 20 and the guide mechanism as shown in FIG. 3 of the drawings is provided with a pair of horizontally spaced apart rollers 32 and 34 engaging an upper surface portion 36 of the tongue 26 and the guide mechanism 24 is provided with a pair of rollers 38 and 40 engaging a lower surface 42 of the tongue 26 so as to allow the tongue to slide forward and backward in the mechanism 24 with a minimum of friction. The pairs of rollers 32 and 34 and 38 and 40 are spaced apart horizontally so as to provide cantilever support, for the tongue 26 which is provided with a conventional trailer hitch 44 on its forward end and this hitch 44 is adapted to be coupled to a conventional ball type hitch member carried by a towing vehicle.

The guide mechanism 24 is provided with a pair of rigid plates 46 and 48 between which the rollers 32, 34, 36 and 38 are mounted and these plates 46 and 48 are coupled to the forward converging frame portions 28 and 30 as hereinbefore described and the plates 46 and 48 are interconnected by a rigid member 50 which carries a latch mechanism 52. This latch mechanism 52 is provided with a substantially vertical tube 54 in which a latch bolt 56 is reciprocally mounted. One side of the tube 54 is provided with an opening 58 in which a latch actuating spring 60 is movably mounted. This spring 60 is provided with an end portion 62 engaging a slot 64 in the latch bolt 56. The spring 60 is pivotally mounted on a pin 66 extending between plates 46 and 48 and the latch spring 60 is provided with a coil portion 68 surrounding the pin 66 and pivoted thereon.

A pair of spaced pins 70 and 72 extending between the plates 46 and 48 provide holding stops for engaging the latch spring 60. These pins 70 and 72 extend only part way between the plates 46 and 48 so that the latch spring 60 may be moved around the ends of the pins alternately to engage the latch spring 60 therewith either in a solid or broken line position as shown in FIG. 3 of the drawings. The extending end of the latch springs 60 is provided with a handle portion 74 and when this handle portion 74 is in the solid line position with the spring engaging the pin 72, the end portion 62 thereof holds the latch bolt 56 in an upward position away from the tongue 36 and when the latch spring 60 is in the broken line position in engagement with the pin 70, the end portion 62 of the latch spring 60 forces the latch bolt 56 downward to a broken line position 76 wherein it enters an opening 78 in the tongue to lock it against longitudinal movement or forward or backward movement relative to the latch mechanism 52. This position as shown in FIG. 3 is a forward position wherein the trailer is in elevated position as will be hereinafter described in detail.

Coupled to a rearward end 80 of the tongue 26 is a cross bar 82 to which tension links 84 and 86 are pivotally connected to the cross bar 82 at 88 and 90 respectively.

The links 84 and 86 are similar and therefore the link 86 together with its respective mechanism will be described as shown in FIGS. 1 and 2 of the drawings.

Coupled to a rearward end 92 of the link 86 is a clevis 94 which is pivotally connected to a leaf spring eye 96 by means of a conventional shackle bolt 98. Thus the clevis 94 acts as a shackle for the end of the leaf spring structure 100 of which the eye 96 is the extending end. This leaf spring 100 is coupled to a bell crank arm 112 mounted on a shaft 114 and adapted to pivot therearound. The shaft 114 at its end 116 is fixed to a gusset plate 118 of the frame 20.

Carried by the bell crank arm 112 in spaced relation to the shaft 114 is a wheel axle 120 on which a wheel 122 is rotatably mounted.

Coupled to the wheel 122 is a cross bar 124 adapted to engage a ledge 126 of a locking device 128 which is provided with a stem 130 adapted to fit in an opening 132 in a socket 134 fixed to the end of the bell crank arm 112. The locking device 128 is thus held such that its ledge 126 is engaged by the bar 124 adapted to prevent rotation of the wheel 122 relative to the bell crank arm 112. The locking device 128 is therefore adapted to lock the wheels of the trailer so that the wheels will frictionally engage the ground and remain stationary while the tongue 26 is pulled forward through the guide mechanism 24 to the latched position as shown in FIG. 3 by broken lines 76 wherein the end of the latch bolt 56 projects through the opening 78.

Figure 4:
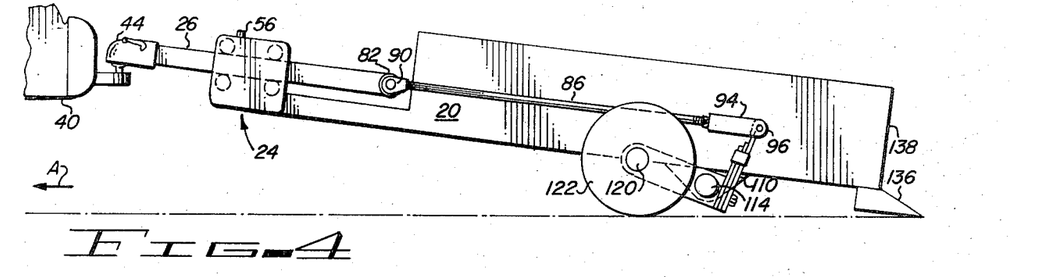
FIG. 4 is a side elevational view of the trailer shown in FIG. 1 coupled to a towing vehicle and in lowered position.
Figure 5:
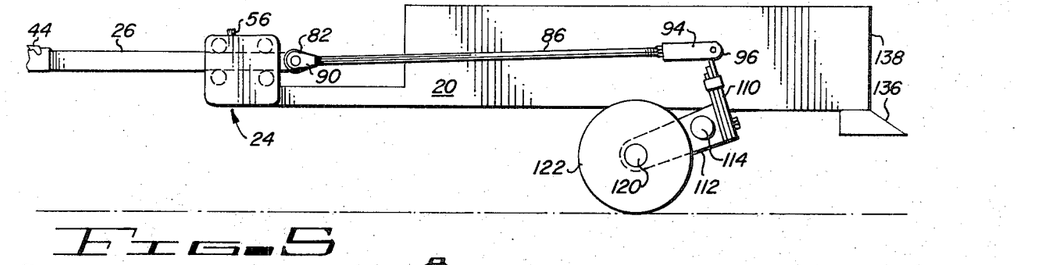
FIG. 5 is a view similar to FIG. 4 showing the trailer in elevated position.

Referring to FIG. 4 of the drawings, the trailer shown in FIG. 1 is in lowest position with the tongue in a backward disposition and with the latch mechanism 52 in the solid line position and the trailer as shown in FIG. 5 is in elevated position with the tongue forward and the latch bolt 56 in the broken line position 76 as shown in FIG. 3 for holding the tongue forward and for holding the bell crank arms 112 in such pivoted position that the wheels 122 support the trailer frame 20 in elevated position. It will be seen that the leaf spring 110 is pulled forwardly at its eye portion 96 by the clevis 94 and tension rods 86 in connection with the cross bar 82 and this causes downward pivotal movement of the bell crank arm 12 about the axis of the shaft 114 thus moving the trailer from the lowered position as shown in FIG. 3 to the elevated position as shown in FIG. 5 wherein the latch bolt 56 at its lower end is in the position indicated at 76 in FIG. 3 of the drawings such as to project into the opening 78 of the tongue 26 and to hold it in forward position. It will be seen that when the trailer is lowered to the position shown in FIG. 3 a ramp portion 136 of the trailer bed carried by the frame 20 is at ground level so that various articles and vehicles may be readily rolled or slid into a rearward portion 138 of the trailer for loading the trailer with a minimum of effort and with a maximum of convenience.

It will be understood that when it is desired to elevate the trailer from the position shown in FIG. 3 to the position shown in FIG. 4 the latch spring 74 is placed in the broken line position as shown in FIG. 3 which tends to force the lower end of the latch bolt 56 through the opening 78 and when the towing vehicle 140 moves forward in the direction of the arrow A in FIG. 3 of the drawings the tongue 26 slides forward between the rollers 32, 34, 38 and 40 carring the cross bar 82 and tension links 84 and 86 forwardly which pivots the respective springs 10 about the axis of the shafts 114 pivoting the bell cranks 112 downwardly at the axle 120 and thereby elevating the frame to the position as shown in FIG. 4 of the drawings wherein the tongue 26 is moved far enough forward so that the lower end of the latch bolt falls into the opening 78 and the latch spring 60 holds the latch bolt downwardly in said opening 78 and thereby locks the tongue 26 in forward position with the trailer in the elevated position as shown in FIG. 5 of the drawings.

Figure 6:
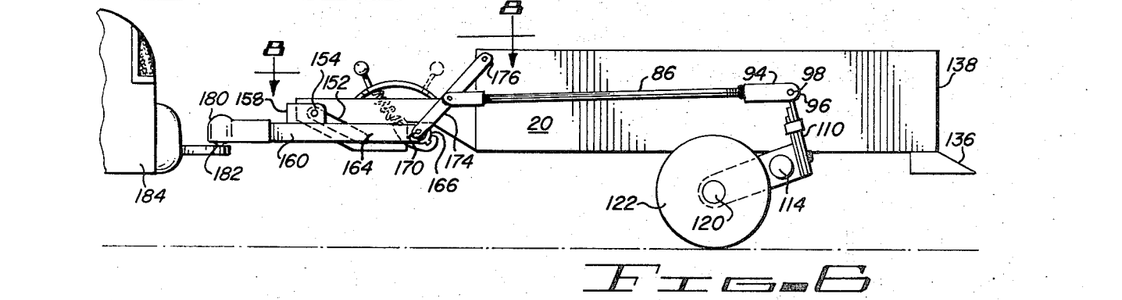
FIG. 6 is a side elevational view similar to FIG. 4 showing a modification of the invention with the trailer in elevated position.

In the modification as shown in FIGS. 6 to 10 inclusive of the drawings, the trailer is provided with a modified frame 142 comprising a trailer bed coupled therewith and this bed has a open end 138 at its rearward portion together with a loading ramp portion 136 and the tension links 86, clevis structure 94, leaf springs 110, bell cranks 112, shafts 114, axles 120, and wheels 122 are all similar to that hereinbefore described. The forward end of the trailer is provided with a modified guide portion 144 shown best in FIGS. 8 and 9 of the drawings wherein this guide portion 144 comprises a pair of spaced apart plates 146 and 148 fixed to a forward portion 150 of the frame 142. The guide plates 144 are provided with upwardly and forwardly inclined guide slots 152. These slots 152 extending through both plates 146 and 148 and being engageable with a guide pin 154 carried by upstanding plates 156 and 158 secured to a tongue structure 160 which is provided with rearwardly diverging members 162 and 164 coupled to a cross bar 166 having pivotal mounts 168 and 170. These pivotal mounts 168 and 170 are pivotally connected to lower ends of respective levers 172 and 174 and upper ends of these levers as shown in FIG. 6 are pivoted at 176 to the frame 142.

Intermediate pivot pin means 178 pivotally connects a forward portion of each tension rod 86 with a respective one of the levers 174, all as shown best in FIGS. 5 to 9 inclusive of the drawings.

The tongue 160 is provided with a hitch portion 180 on its forward end adapted to be coupled to a conventional hitch 182 carried by a rearward portion 184 of a towing vehicle.

Each of the forwardly extending plates 146 and 148 is provided with a notch ledge 186 adapted to provide a stop for the cross bar 166 when it is pulled into forward position by the tongue 160 when the towing vehicle 184 moves the tongue forward. It will be seen that as the tongue is moved forward the guide pin 154 traverses the inclined slots 152 in the plates 146 and 148 causing the forward end of the frame 142 to be cammed downwardly whiled the levers 174 concurrently pull the tension rods 86 and project the wheels 122 downwardly around the axis of the bell crank shafts 114. It will be understood that the structure shown in FIGS. 6 to 9 of the drawings may be provided with a locking means similar to the locking means 128 hereinbefore described or conventional brakes such as electric brakes or the like may be utilized in connection with brake drums coupled to the wheels 122 for locking the wheels during the forward movement of the towing vehicle and the forward movement of the tongue 160 for camming the plates 146 and 148 downwardly in accordance with the inclined angle of the slots 152 which are engaged on the cross pin 154. Accordingly the forward end of the trailer frame is forced downwardly while the rear end of the trailer frame is forced upwardly by means of the bell cranks 112.

It will be seen that when the wheels 122 are locked that the bell cranks 114 tend to pivot about the wheels and to provide great lifting force in addition to the downward camming movement of the forward portion of the frame by means of the inclined slots 152 engaging the cross pin 154. The cross pin 154 being a guide means in connection with the tongue while the inclined slots 152 constitute a guide means on the forward portion of the trailer frame. Accordingly forward movement of the towing vehilce 184 elevates the trailer from the position shown in FIG. 7 to the position shown in FIG. 6 so that the ramp 136 is moved from a loading position to an elevated position after the loading of the trailer bed has been accomplished as hereinbefore described.

Figures 8, 9, 10:
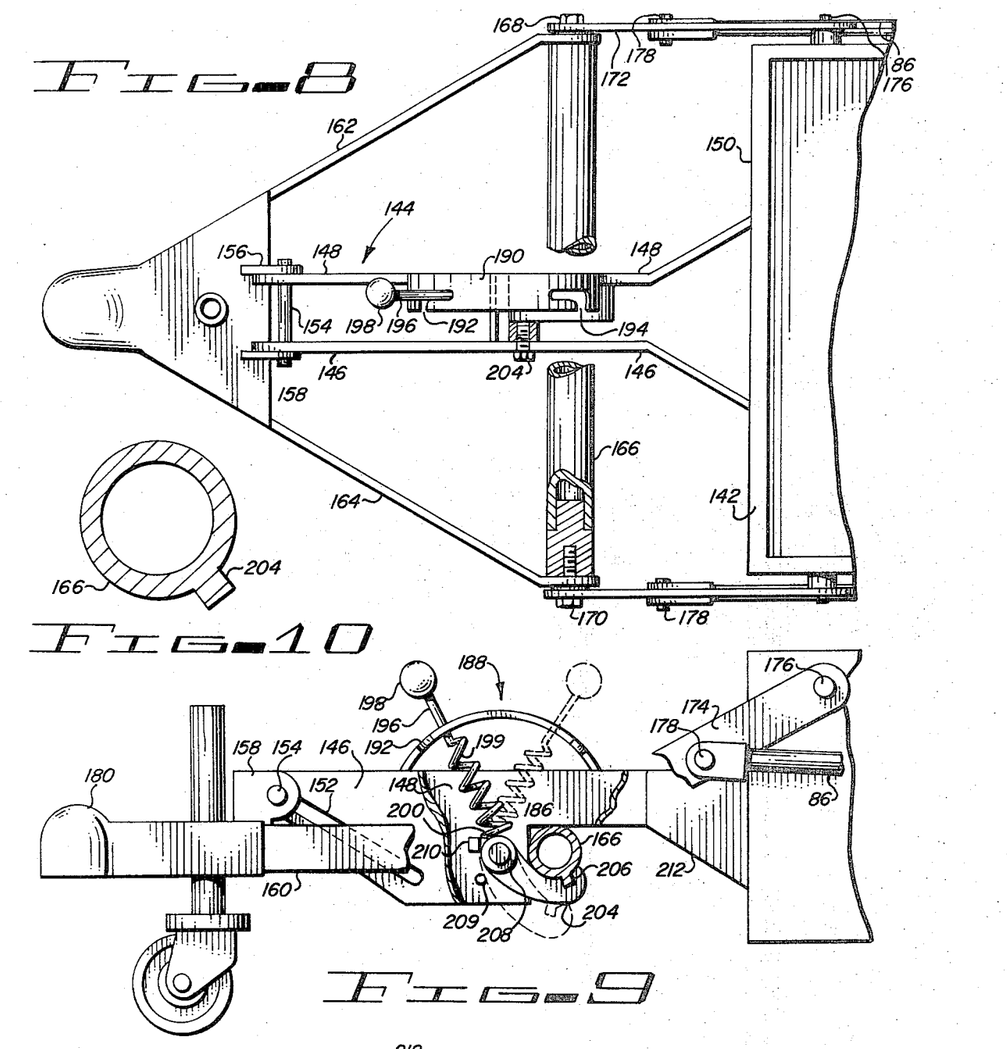
FIG. 8 is an enlarged fragmentary plan view taken from the line 88 of FIG. 6 showing parts and portions broken away and in section to amplify the illustration.
FIG. 9 is a side elevational view of the structure shown in FIG. 8 showing portions thereof fragmentarily and in section to amplify the illustration.
FIG. 10 is an enlarged cross sectional view of a latch bar structure of the invention.

Tongue latch mechanism 188 shown in detail in FIG. 9 of the drawings is mounted on the plates 146 and 148 which also are disclosed in FIG. 8. Mounted on the plate 148 is an accuit plate 190 having L-shaped slots 192 and 194 therein. These slots are opposed and are adapted to engage a shifting handle 196 having a manually engagable knob 198 thereon. The handle 196 is coupled to a coiled spring 198 and this coiled spring is fixed to an upper end 200 of a latch hook 202 which is pivotally mounted on a pin 204 between the plates 146 and 148. The latch hook 202 is provided with a hook portion having a notch 204 engagable with a lug 206 on the cross bar 166 and the lug 206 is also shown in FIG. 10 on an enlarged scale. When the handle 196 is in the solid line position shown in FIG. 9, the spring tends to hold the latch hook 202 in the solid line position shown in FIG. 9 and when the handle 196 is engaged with the slot 194, the spring 199 tends to release the latch hook 202 and move it against a stop member 208 carried between the plates 146 and 148.

Another stop member 210 prevents the latch hook 202 from pivoting substantially beyond the solid line position shown in FIG. 9 so that the cross bar 166 may pass under lower edge portions 212 of the plates 146 and 148 an into the position against the stop ledge 186 so as to allow the latch 202 to be deflected and pivoted around the cross bar 166 and into engagement with the lug 204.

Figure 7:
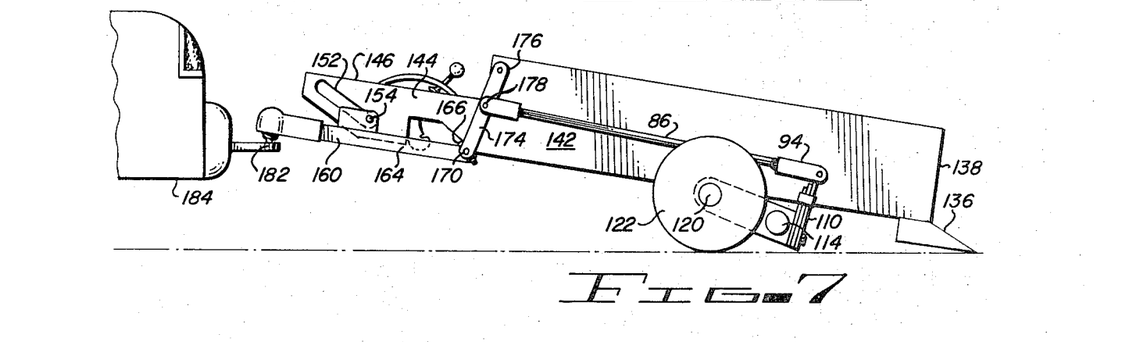
FIG. 7 is a side elevational view of the species of the invention disclosed in FIG. 6 and shown in lowered position.

In operation the trailer may be elevated from the position shown in FIG. 7 to the position shown in FIG. 6 by placing the lever 196 in the slot 192. This forces the latch hook 202 against the stop 210 into substantially the solid line position shown in FIG. 9 of the drawings whereupon forward movement of the towing vehicle pulls the tongue 160 forward and cams the plates 146 and 148 downward by means of the inclined slots 152 bearing on the cross pins 154. Likewise at the same time the bell cranks 112 are pivoted downwardly elevating the rearward portion of the frame 142 and in this movement the bar 166 passes forward into proximity of the stop ledge 186 whereupon it deflects the latch hook 202 against resilience of the spring 199 and allows the latch hook to snap into position over the lug 206 by engaging it with its notch 204 which locks the tongue 160 in forward position, with the trailer in the elevated position shown in FIG. 6 of the drawings.

Figure 11:
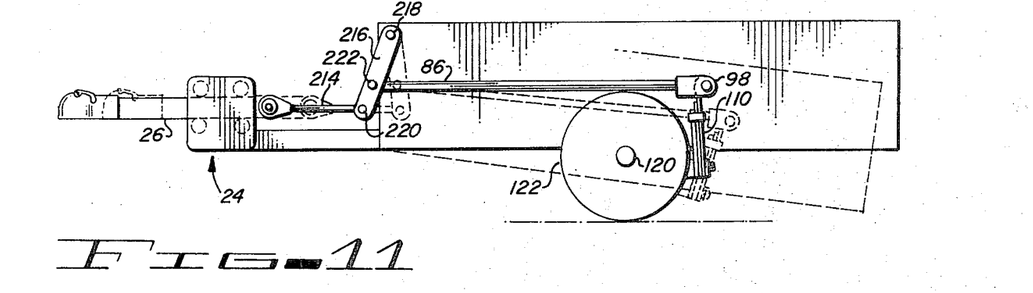
FIG. 11 is a side elevational view similar to FIG. 4 showing a modification of the invention using pivotal mounts attached to the frame.

In the modification as shown in FIG. 11 of the drawings, the cross bar 82 coupled to the tongue 26 is provided with short connecting links 214 coupled to levers 216 similar to the levers 174 hereinbefore described such that the tension rods 86 are operable in the same manner as that disclosed in FIGS. 6 and 9 of the drawings. Thus the levers 216 are pivoted to the frame at their upper ends on pivotal mounts 218 and are pivotally connected to the links 214 by means of pivot pins 220 and the tension links 86 are pivotally connected to the levers 216 by means of pivotal connections 222.

It will be seen that the embodiment of the invention disclosed in FIG. 1 may utilize the levers 216 for additional lifting leverage, for pulling the springs 110 forward at their clevis pins 98 for pivoting the respective wheel axles 120 downwardly and thereby supporting the trailer in elevated position on the wheels 122 as hereinbefore described in connection with FIGS. 1 to 4 of the drawings. The levers 216 merely being used to increase leverage of the specific elevating mechanism disclosed in FIG. 1 of the drawings.

Figures 12, 13, 14:
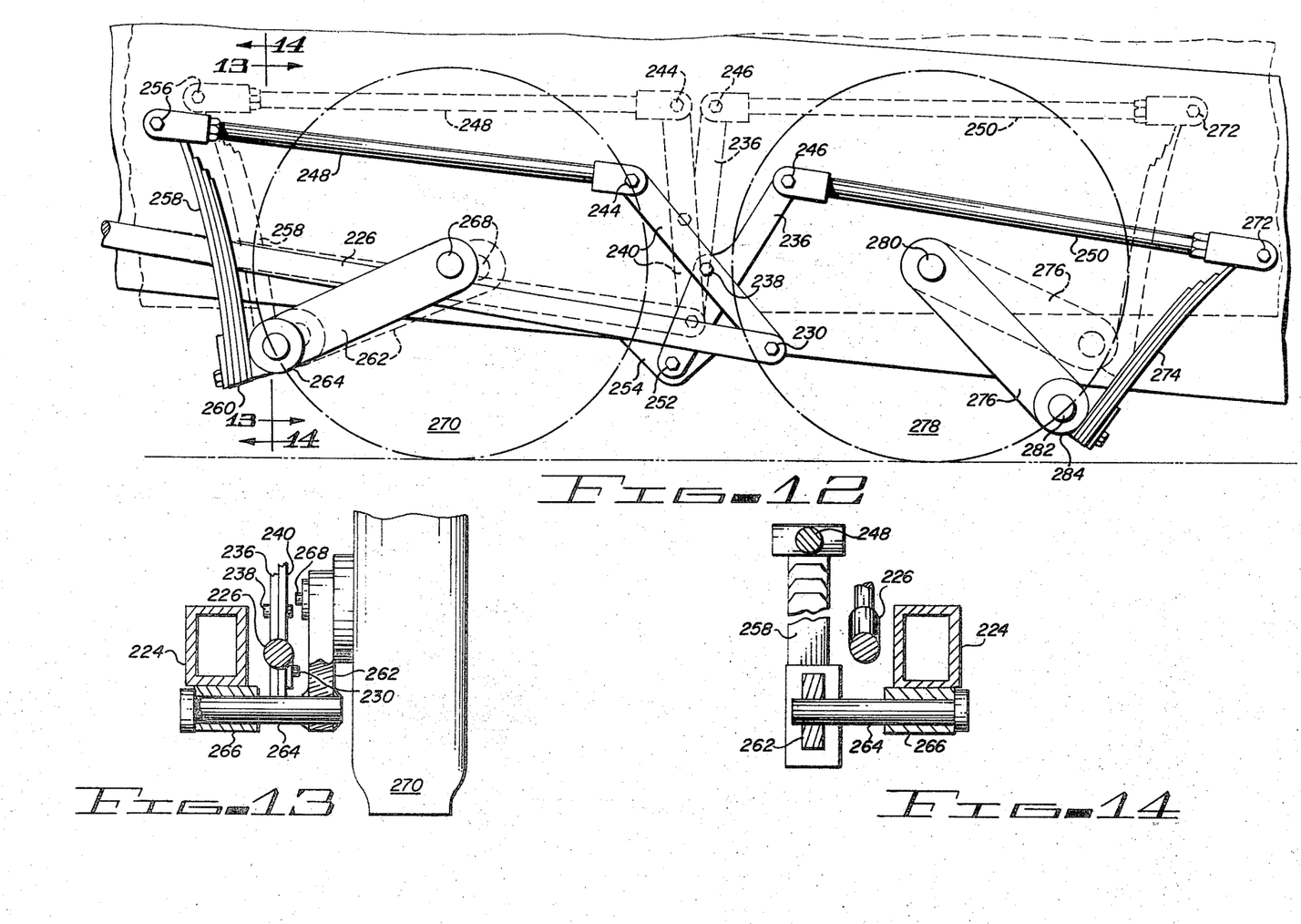
FIG. 12 is a fragmentary side elevational view of a modification of the invention disclosing a tandem wheel elevatable trailer operable by a novel scissor linkage and lever mechanism and showing varying positions thereof by broken lines.
FIG. 13 is a fragmentary sectional view taken from the line 1313 of FIG. 12.
FIG. 14 is a fragmentary sectional view taken from the line 1414 of FIG. 12.

In the modification as shown in FIGS. 12, 13 and 14 of the drawings, the tongue 160 together with the forward frame portions 146 and 148 are similar to that hereinbefore described in connection with FIGS. 6 to 9 inclusive. In the modification shown in FIGS. 12, 13 and 14 a modified frame 224 carries the levers 174 with pivotal connections 176 as hereinbefore described and modified tnesion rods 226 are coupled at the pivotal connection 178 by means of clevises 228. These modified tension rods 226 are pivotally connected at 230 to a lower end 232 of a scissor lever 234. The mechanism thus described is common to both sides of the trailer and is related to actuation of tendem wheels on each side of the trailer as will be hereinafter described.

The scissor lever 234 is pivotally connected to another scissor lever 236 by means of a pivot pin 238 and the levers 234 and 236 are provided with respective upper ends 240 and 242 having pivotal connections 244 and 246 pivotally connected to short tension rods 248 and 250 respectively.

The lower end of the scissor lever 236 is pivoted at 252 to a gusset 254 on the frame 224 and this mechanism is movable from the solid line position to the broken line position as shown in FIG. 12 for elevating the trailer bed from a ground level location to an elevated position as indicated by broken lines. The opposite end of the tension rod 248 from its pivotally connection 244 is provided with a pivotal shackle connection 256 coupled to an eye of a leaf spring 258 which is fixed at 260 to a bell crank arm 262 pivotally mounted on a shaft 264 shown in FIG. 13 of the drawings. This shaft 264 is pivotally mounted in bearing 266 coupled to the frame 224. The bell crank arm 262 carries an axle 268 rotatably mounting a wheel 270 such that the axle 268 is substantially spaced from the bell crank axis provided by the shaft 264 for raising and lowering the bed of the trailer frame 224 relative to the ground.

The tension rod 250 is likewise coupled by means of a clevis pin 272 to an eye of a leaf spring 274 fixed to a bell crank arm 276 similar to the bell crank arm 262 and a respective wheel 278 is rotatably mounted on an axle 280 similar to the axle 268 hereinbefore described while the bell crank arm 276 is pivotally mounted on a shaft 282 carried in a bearing 284 similar to the bearing 266 hereinbefore described and this bearing 284 is fixed to the frame 224.

In operation the scissor linkage provided by the levers 236 and 240 the tandem wheels are actuated in unison and are commonly loaded by the forward movement of the tension rods 226 coupled to the levers 174 hereinbefore described. As the tongue 160 is pulled forward as hereinbefore described by the towing vehicle, the lower end portion of the lever 240 at its pivotal connection 230 is pulled forward. This also tends to pull the pivotal connection 238 and the intermediate portion of the scissor lever 236 forward since the lower end of the lever 236 is pivoted at 252 on the gusset 254 fixed to the frame 224. Accordingly such action forces the upper ends of the scissor levers 236 and 240 together bringing together their pivotal connections 244 and 246 and concurrently and evenly applying force to the respective bell crank arms 276 and 262 for pivoting these arms about their respective shafts 282 and 264 and for thereby elevating the bed of the trailer.

It will be understood that the scissor mechanism hereinbefore described is particularly adapted for coupled the elevated linkage of tandem wheels and as shown in FIG. 12 of the drawings one side of the vehicle is disclosed while the opposite side is similar coupled to the cross bar 166 which is similar to that disclosed in FIGS. 6 to 9 inclusive of the drawings.

Figure 15:
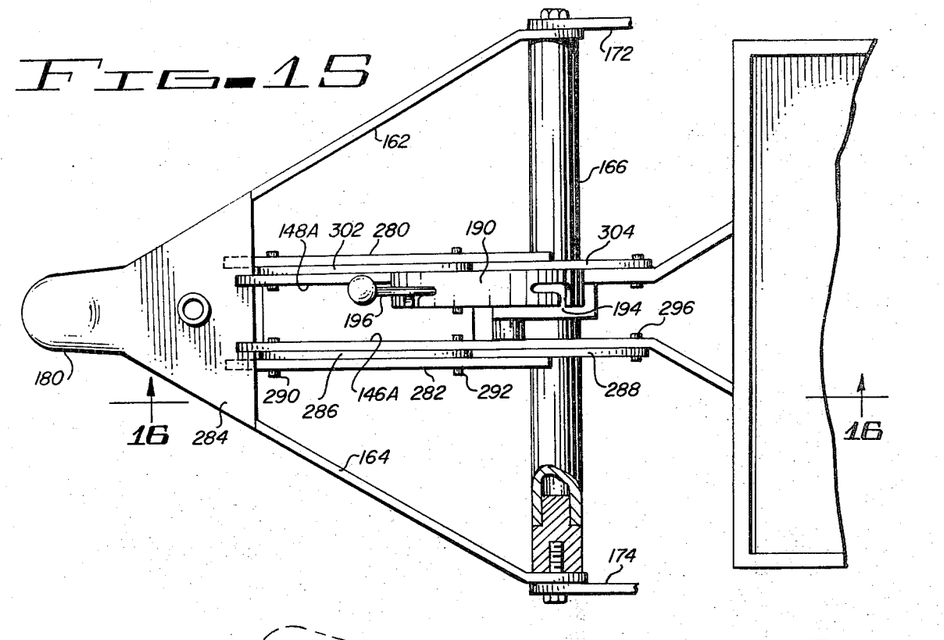
FIG. 15 is a view similar to FIG. 8 showing a further modification of the invention.
Figure 16:
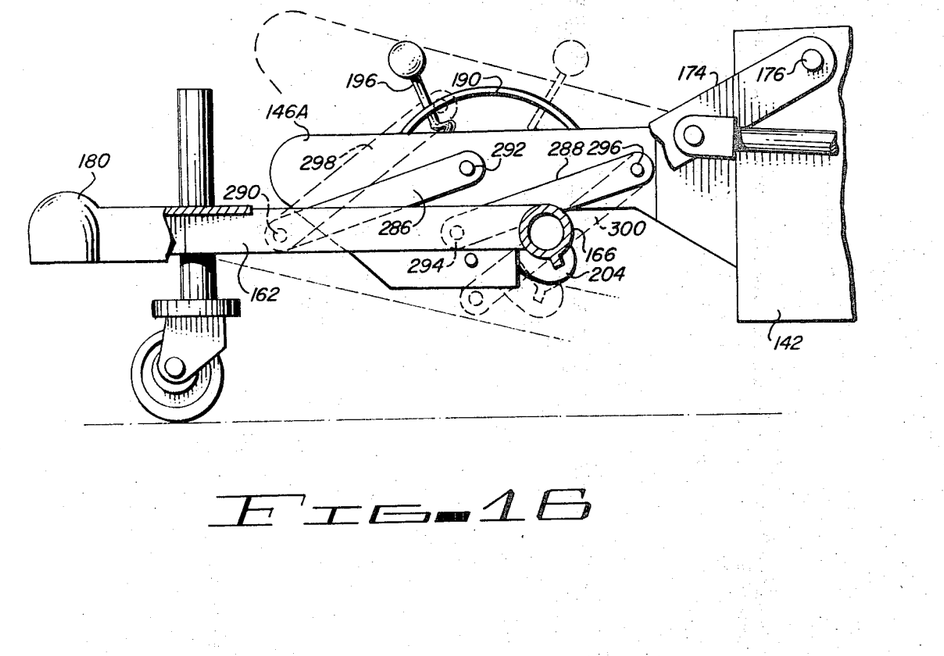
FIG. 16 is a sectional view taken from line 16—16 of FIG. 15.

The mechanism shown in FIGS. 15 and 16 discloses a modification and these views 15 and 16 are similar to FIG. 8 and 9 and disclose similar mechanisms.

Corresponding reference characters refer to similar parts in both structures and in accordance with the modification shown in FIGS. 15 and 16, the tongue portions 162 and 164 are coupled to the cross bar 166 and additional longitudinal members 280 and 282 interconnect the forward plate 284 of the tongue 180 and the cross bar 166, thus the members 280 and 282 have forward ends fixed to the plate 284 and rearward ends fixed to the cross bar 166.

The frame is provided with forward portions 146A and 148A which are similar to the forward frame portions 146 and 148 shown in FIG. 8 of the drawings. The parts 146A and 148A are modified and adjacent the forward portion 146A are a pair of parallel links 286 and 288 shown best in FIG. 16 of the drawings. These links 286 and 288 are parallel with each other and the link 286 is pivotally connected by a pin 290 to the members 282 and 146A and the upper end of the link 286 is pivotally connected by means of a pin 292 to the forward frame portion 146A. The parallel link 288 is connected by means of a pin 294 to the forward frame portion 146A and the tongue portion 282. The upper rear portion of the parallel link 288 is connected by means of a pin 296 to the forward frame portion 146A. Thus the parallel links 286 and 288 may be disposed in the broken line positions 298 and 300 when the tongue 162 is moved backwardly to the broken line position to thereby elevate the frame portions 146A and 148A as indicated by broken lines in FIGS. 16 of the drawings. This is possible when the latch 204 is disengaged and this latch 204 operates in a similar manner hereinbefore described in FIGS. 8 and 9 of the drawings.

With a relative forward movement of the tongue 162 and hitch 180 the parallel links 286 and 288 cause a relative downward movement of the frame portions 146A and 148A relative to the tongue, all as indicated by solid and broken lines in FIG. 16 of the drawings.

It will be seen that a pair of parallel links 302 and 304 correspond with the links 286 and 288 and are coupled and pivoted in a similar manner to the links 286 and 288 relative to the tongue and forward portions of the frame. The parallel links 302 and 304 are disposed between the forward portion 148A of the frame of the trailer, and the member 280, all as shown best in FIG. 15 of the drawings, thus a pair of parallel links are disposed on each opposite side of the forward frame portions 146A and 148A and operate to provide for relative elevation and lowering of the forward portion 142 of the trailer so that the rearward portion of the trailer may pivoted over the axis of the wheels and downwardly into adjacent position relative to the ground, all as hereinbefore described in relation to the other structures of the elevating trailer mechanism hereinbefore disclosed in detail.

It will be obvious to those skilled in the art that various modifications may be resorted to without departing from the spirit of the appended claims.

I claim:

1. In an elevatable trailer; a frame having a forward end and opposite sides; bell crank arms pivotally mounted on said frame on horizontal axis at opposite sides of said frame; wheels rotatably mounted on said bell crank arms in spaced relation to said horizontal axis; cantilever springs fixed to said bell crank arms and having shackle portions extending a substantial distance upwardly from said horizontal axis; tension rods pivotally coupled to said shackle portions; said tension rods extending towards said forward end of said frame; a cross bar having opposite ends pivotally coupled to said tension rods; a tongue coupled to said cross bar and having a forward end extending beyond said forward portion of said frame; a hitch coupled to said forward end of said tongue; a tongue guide carried by said forward portion of said frame; said tongue reciprocally mounted to move to forward and rearward positions relative to said tongue guide; and releasable latch means disposed to lock said tongue in said forward position for holding said bell crank arms in a pivoted position wherein said frame and said horizontal axis are in elevated position.

2. The invention as defined in claim 1 wherein said tongue is provided with upper and lower services; said tongue guide having a first plurality of horizontally spaced apart rollers engaging said upper portion of said tongue; said tongue guide having a second plurality of horizontally spaced apart rollers engaging said lower surface of said tongue.

3. The invention as defined in claim 1 wherein intermediate levers pivotally interconnect said cross bar and said tension rod; each intermediate lever having one end pivotally coupled to said frame; each lever having another end pivotally coupled to said cross bar; a respective one of said tension rods pivotally coupled to one of said levers at a location between said ends thereof.

4. The invention as defined in claim 3 wherein said tongue guide is provided with a first guide means affixed to said tongue; said forward portion of said frame having inclined guide means extending upwardly at an angle to the horizontal and towards said forward portion of said frame; said inclined guides means engagable with said first guide means and slidable forwardly and rearwardly relative thereto for elevating and lowering said forward portion of said frame relative to said tongue.

5. The invention as defined in claim 4 wherein said latch means comprises releasable spring loaded hook means pivotally coupled to said forward portion of said frame and adapted to engage and lock said tongue in said forward position; a spring having one end fixed to said hook means; said spring having an opposite end; a manually operable handle coupled to said opposite end of said spring; and a holding bracket on said frame having a pair of spaced apart detent portions adapted to hold said spring in either of two positions tending to pivot said hook means into and out of engagement with said cross bar; said hook means having a hook portion adapted to engage said cross bar and hold it in a forward position.

6. The invention as defined in claim 5 wherein said cross bar is provided with a lug thereon; said hook means having a notch engageable with said lug for holding said tongue in said forward position relative to said frame.

7. The invention as defined in claim 1 wherein means is provided for locking said wheels against rotation relative to said bell crank arms.

8. The invention as defined in claim 1 wherein a pair of said bell crank arms and a pair of said springs are disposed at each of said opposite sides of said frame; said shackle portions pivotally coupled to said tension rods; lever and linkage means coupling said shackle portions to said tension rods; said lever and linkage means each comprising a pair of scissor levers; each scissor lever having upper and lower ends and an intermediate portion between said upper and lower ends; said intermediate portions of said scissor levers pivotally connected together; said lower end of one of said scissor levers pivotally mounted on said frame; said lower end of the other one of said pair of scissor levers pivotally coupled to said tension rod; and a pair of second tension rods; each one of said pair of said second tension rods interconnecting one shackle portion of one of said pair of contilever springs and one of said upper ends of one of said pair of scissor levers.

9. In an elevatable trailer mechanism; a frame having a forward end opposite sides; bell crank arms pivotally mounted on said frame on horizontal axes at opposite sides of said frame; wheels rotatably mounted on said bell crank arms in spaced relation to said horizontal axes; cantilever springs fixed to said bell crank arms and having shackle portions extending a substantial distance upwardly from said horizontal axes; tension rods pivotally coupled to said shackle portions; said tension rods extending towards said forward end of said frame; a cross bar having opposite ends pivotally coupled to said tension rods; means pivotally connecting said tension rods to said cross bar; a tongue coupled to said cross bar and having a forward end extending beyond said forward portion of said frame; a hitch coupled to said forward end of said tongue; a tongue guide carried by said forward portion of said frame; said tongue reciprocally mounted to move to forward and rearward positions relative to said frame; said tongue guide comprising at least one pair of parallel links pivotally interconnecting said forward portion of said frame and said tongue to allow relative elevating and lowering of said forward portion of said frame relative to said tongue corresponding respectively with rearward and forward movement of said tongue relative to said forward portion of said frame; and releasable latch means disposed to lock said tongue in said forward portion for holding said bell crank arms in a pivoted position wherein said frame and said horizontal axes are in elevated position.

* * * * *